(12) United States Patent
Raciborski

(10) Patent No.: US 8,336,110 B2
(45) Date of Patent: Dec. 18, 2012

(54) AUTHENTICATION OF CONTENT DOWNLOAD

(75) Inventor: Nathan F. Raciborski, Phoenix, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 194 days.

(21) Appl. No.: 13/004,762

(22) Filed: Jan. 11, 2011

(65) Prior Publication Data

US 2011/0145673 A1 Jun. 16, 2011

Related U.S. Application Data

(63) Continuation of application No. 12/421,533, filed on Apr. 9, 2009, now Pat. No. 7,891,014, which is a continuation of application No. 10/935,897, filed on Sep. 7, 2004, now Pat. No. 7,536,725, which is a continuation-in-part of application No. 10/901,893, filed on Jul. 28, 2004, now Pat. No. 8,122,100.

(60) Provisional application No. 60/508,626, filed on Oct. 3, 2003, provisional application No. 60/500,388, filed on Sep. 5, 2003, provisional application No. 60/490,810, filed on Jul. 28, 2003.

(51) Int. Cl.
H04L 29/06 (2006.01)

(52) U.S. Cl. ............................................. 726/30; 726/1
(58) Field of Classification Search .................. 726/1, 30
See application file for complete search history.

(56) References Cited

U.S. PATENT DOCUMENTS

| 6,151,620 | A  | * | 11/2000 | Madsen et al. ................. 709/204 |
| 6,917,923 | B1 | * | 7/2005 | Dimenstein ....................... 705/51 |
| 7,165,076 | B2 | * | 1/2007 | Bentley ................................. 1/1 |
| 7,536,725 | B2 |   | 5/2009 | Raciborski |
| 7,891,014 | B2 |   | 2/2011 | Raciborski |
| 2001/0039659 | A1 | * | 11/2001 | Simmons et al. ................ 725/61 |
| 2002/0194309 | A1 | * | 12/2002 | Carter et al. .................... 709/219 |
| 2003/0005135 | A1 | * | 1/2003 | Inoue et al. .................... 709/229 |
| 2005/0132083 | A1 |   | 6/2005 | Raciborski et al. |

* cited by examiner

*Primary Examiner* — Michael Pyzocha
(74) *Attorney, Agent, or Firm* — Kilpatrick Townsend & Stockton, LLP

(57) ABSTRACT

According to the invention, a method for authenticating download of a number of digital content files ordered from a web site is disclosed. In one step, a selection of the digital content files is received with the web site. Download manager software, media information, the digital content files, and first codes for each of the digital content files are sent to the client computer. The media information indicates a location of each of the number of digital content files. A first code is calculated for each of the digital content files. If the client computer determines that the first code doesn't match a second code for a particular digital content file, it is resent.

17 Claims, 6 Drawing Sheets

AUTHENTICATION OF CONTENT DOWNLOAD

This application is a continuation of U.S. application Ser. No. 12/421,533 filed Apr. 9, 2009, which claims the benefit of and is a Continuation of U.S. application Ser. No. 10/935,897 filed Sep. 7, 2004, now U.S. Pat. No. 7,536,724 issued May 19, 2009, which claims the benefit of and is a non-provisional of U.S. Application Ser. No. 60/500,388 filed on Sep. 5, 2003 and also claims benefit of and is a continuation in part of U.S. application Ser. No. 10/901,893 filed on Jul. 28, 2004, which is a non-provisional of U.S. Application Ser. No. 60/490,810 filed on Jul. 28, 2003 further claims the benefit of and is a non-provisional of U.S. Application Ser. No. 60/508,626 filed on Oct. 3, 2003. All six of these references are incorporated by reference in their entirety for all purposes.

This application is related to U.S. patent application Ser. No. 10/936,446, filed on Sep. 7, 2004, entitled "MANAGEMENT OF DIGITAL CONTENT LICENSES", which is incorporated by reference in its entirety for all purposes.

BACKGROUND OF THE DISCLOSURE

This disclosure relates in general to downloading content and, more specifically, but not by way of limitation, to downloading digital content from the Internet.

Today, files are typically downloaded using Hyper Text Transfer Protocol (HTTP). An origin server initiates the download after a file is requested. A requested file is sequentially sent in packets to the client computer upon request. Where packets do not arrive at the client computer, they are requested again from the origin server. The origin server presumes the downloaded file has been successfully sent after the client computer stops requesting packets. The client computer stops requesting packets after enough packets are received to equal the file size.

In many cases, the file is not actually stored to the client computer in a usable form. For example, the client computer could crash before it could request a corrupt packet, a virus could attach to the file, an error could occur when writing the file to the hard drive and/or other problems that prevent the client computer from using the file. When users are unable to use a downloaded file, they may contact the operator of the origin server to get authorized to download another copy of the file.

BRIEF DESCRIPTION OF THE DRAWINGS

The present disclosure is described in conjunction with the appended figures.

Figure 1A:
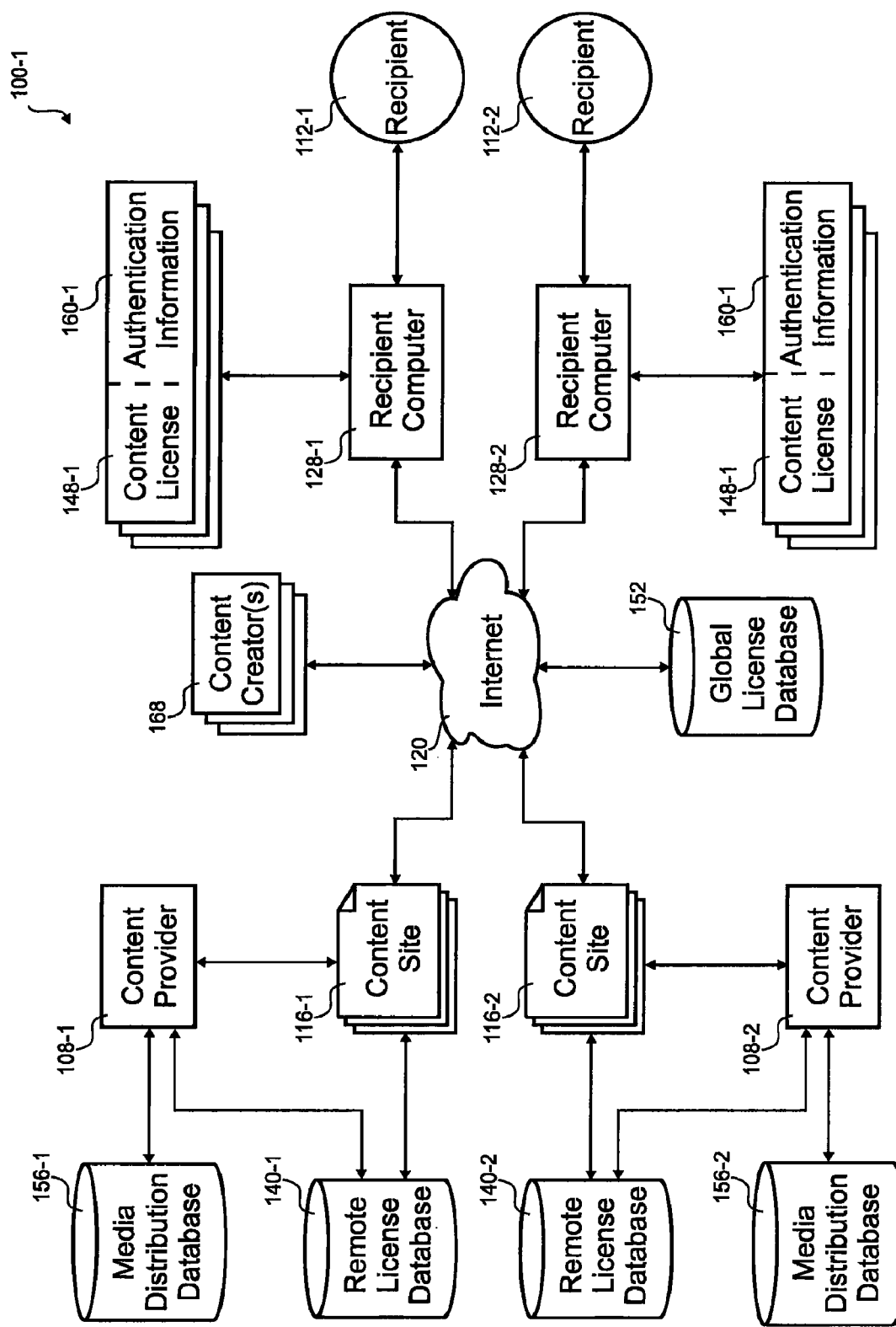
FIGS. 1A and 1B are block diagrams of embodiments of a content download system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order to the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "computer-readable medium" includes, but is not limited to portable or fixed storage devices, optical storage devices, and various other mediums capable of storing, or containing data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In one embodiment, the client computer installs a download manager program. In other embodiments, the functionality of the download manager program could be integrated into the operating system; web browser, content player, or other application software; or a browser script, applet or plug-in. The download manager downloads the referenced content objects and checks that the stored versions of the referenced content objects are authentic. Upon successful authentication, the origin server is notified such that delivery is confirmed.

Authentication is a process where the veracity of the content object is confirmed. In a digital media file that encapsulates the content object, metadata indicates a cyclical redundancy check (CRC), hash or checksum of an authentic digital media file. The metadata could use XML or another format. For example, the file could include a Secure Hashing Algorithm 1 (SHA-1) hash in the metadata that is checked against a SHA-1 hash calculated when the download manager checks the digital media file. Some embodiments may query the origin server for the hash value of a particular digital media file where the hash value is not stored in metadata. A database at the client computer, origin server or other location could store the hash values for files in a manner such that the download manager can access the hash values when checking authenticity. One embodiment stores the hash value in a download manager file used to transport the download manager software. Other embodiments may encrypt the digital content. Having the ability to decrypt it successfully serves as authentication.

Where the file cannot be authenticated, a replacement file could be retrieved without contacting customer support associated with the origin server. The download manager notifies the user and the origin server or content provider that the download was unsuccessful. The user is given the option to download the file immediately or to request the download later. In some cases, the user's account may not be charged or any charge may be reversed where the download is reported as unsuccessful. Other embodiments may automatically download a replacement file until an authentic file is confirmed as received. If a user does call customer support complaining of a corrupt file, a database can be queried to determine if the original download was successful and if the user ever received a valid copy of the digital media file.

Some embodiments of the invention could periodically check all downloaded files to authenticate them. Where one or more files cannot be authenticated, the files could be replaced automatically or after asking the user. File updates can be distributed by updating a database of hash values with a hash value of a new version of the file. When the hash value cannot be authenticated at the next check, the download manager or some other program would download the new version and overwrite the old version. For example, the origin server operator may realize that a particular digital media file has an encoding error and replace it with a corrected version having a different hash value. The new hash valued would be used by the download manager to determine that the digital media file was bad. All users that downloaded the digital media file with the error can receive the new one when the download manager performs the next authentication.

In some cases, copyright holders may not want the users of their content to create derivative works or otherwise modify a media file. After modification, the download manager notices that the hash no longer matches and will update the file with the original version. Some embodiments may notify the user before any downloaded file is overwritten. Other embodiments may just delete the modified file where the hash no longer matches. Examples of downloaded digital media files include digitized video, digitized audio, digitized sound, music, data, digital pictures, software, video games, electronic books, electronic documents, or other electronic files.

Other programs could authenticate files. For example, a virus checking program could verify the authenticity of each file. Where files are found to be corrupt because of a virus or other problem, the origin server could be contacted for another copy. A database or XML with the hash value could also store information for contacting the origin server for another copy of the file. Some embodiments could check authorization to determine if the client computer is authorized to get replacements for the file. Some embodiments, may charge for the replacement or provide it for free. For example, where the software file is covered under a service contract or content subscription, replacements are allowed, but are charged for where the contract or subscription has expired.

With reference to FIG. 1A, a block diagram of an embodiment of a content download system 100-1 is shown. This embodiment shows two content providers 108 and two recipients 112, but there could be any number of each in various embodiments. The content download system 100 could have different configurations with certain blocks spit or combined and/or spread among different locations to achieve the disclosed functionality.

A recipient 112 or licensee of the content interacts with a recipient computer system 128 that is coupled to a content site 116 over the Internet 120 or some other wide area network. The content site 116 is a series of web pages, applets, forms, etc. that allow choosing, purchasing, checking status, and downloading of content and licenses. The recipient computer system 128 could include a music player, a video player, a personal video recorder (PVR), a personal digital assistant (PDA), a desktop computer, a laptop computer, or any other device or program that allows realizing content. Interaction with the content site 116 is performed with a web browser, embedded software and/or application software on the recipient computer 128. One or more programs downloaded from the content site 116 may aid in the interaction.

Coupled or integral to the recipient computer 128 are stored a content license and authentication information for some of the content. Some content may not have express licenses or authentication information. The content license 148 indicates for each piece of content how it can be used, shared, copied, stored, played, etc. Additional terms in the content license 148 may be used to get discounts on content related to that licensed. A DRM function in the recipient computer 128 may use the content license 148 to enforce the rules. The authentication information 160 indicates codes and algorithms used in checking if a piece of digital content is authentic. Each piece of digital content can have different algorithms and/or codes. The authentication information 160 can be updated by the content provider 108.

The content license 148 and authentication information 160 for each piece of content can be stored in the download manager file or digital media file for that piece, in a database, or in another location available to the recipient computer. One embodiment stores either or both of the license 148 and authentication information 160 remote to the recipient computer 128 on a local or wide area network that can be accessed as needed.

A content provider 108 is associated with the content site 116. The content provider 108 provides the content and codes it onto media files for the recipient 112. The content may be stored within the content provider 108 or requested from a content creator 168 (i.e., various copyright holders and their agents who supply the content to the content provider 108). The ability for the content provider 108 to offer content in various tangible forms with various license terms is regulated by the copyright holders associated with each performance. The rights of the original creators of the copyrights could be assigned to other entities that license dissemination. The content provider can confirm that the content is downloaded to the recipient computer 128 along with counting how many times the content was downloaded.

Various performances (e.g., a sound performance, a videotaped performance, a written performance, a pictured performance, a theatrical performance, etc.) are offered in a tangible form. There are many options for the tangible form that are defined by their media (e.g., disk, book, eBook, file, tape, film, record, music score, written play, poster, print, slide, etc.) and format (e.g., CD, DVD, HD DVD, laser disk, MD disk, hard bound book, soft bound book, pamphlet, brochure, audio or video files using various compression schemes and bitrates, cassette tape, 8 track tape, reel-to-reel tape, 35 mm film, 50 mm film, 8 mm film, vinyl record, wax record, etc.). A content provider 108 may support some or all of these tangible forms. In some cases, the tangible forms are created on the fly, for example, the user may select MP3 at a 320 Kbps bitrate that is generated from a master CD after request by a recipient 112.

This embodiment has a remote license database 140 that is accessible to the content provider. The remote license database 140 tracks the same sort of information for each recipient 112 as that stored in each locally in the content licenses 148. Should a particular recipient 112 loose their local licenses 148, they can be recreated with information from the remote license databases 140 for content providers 108 that provided content to the recipient 112. In some embodiments, the recipient computer system doesn't store content licenses locally, but relies on the remote license database 140 or a global license database 152 when desired.

This embodiment also includes a global license database 152 although some embodiments may not. As content licenses are purchased and recorded by the recipient system and the content provider system, the licenses are also recorded in a global license database 152. Some embodiments of the content provider 108 may store them in the remote license database 140 first before updating the global license database 152, while other embodiments may forgo the remote license database 140 altogether and rely upon the global license database 152. A content provider 108 may query the global license database 152 during the transaction for licenses of the particular recipient 112 that may have been purchased from another content provider 108. Some embodiments may periodically synchronize their remote license database 140 with the global license database 152 such that checking the global license database 152 with each transaction is not performed.

Each content provider 108 in this embodiment maintains a media distribution database 156. Stored in the media distribution database 156 is the authentication information for each piece of content. Additionally, the media distribution database 156 stores where the content files have been delivered. After a content file or download manager file are accepted, the user, machine, drive, path, and filename information is reported back to the media distribution database 156. Should the recipient 112 forget where a file is stored, the download manager could indicate or a query to the content provider 108 could indicate the location by referencing the media distribution database 156.

In some embodiments, each recipient receives a signature token for each digital media file. The signature token could be shared with a number of recipients 112 who receive the same digital content file or it could be unique to each recipient. In any event, the signature token and/or other authentication information is stored in the media distribution database 156.

The recipient computer 128 could rely upon the authentication information 160 stored locally in some embodiments or could periodically query the media distribution database 156 to update the local authentication information 160 in other embodiments. Some embodiments may not store authentication information 160 locally, but rely on the media distribution database 156 or some other remote database.

The content provider 168, content creator 168 or some other party involved in distribution or production of the content can update the digital content. Often a mistake in the digital content encoding or metadata can be later uncovered. The authentication tokens stored in the media distribution database 156 and global license database 152 are updated for the corrected version as well as already distributed versions. If the recipient computer updates the authentication information 160 or otherwise queries the databases 156, 152 for updated signature tokens, the version of the digital content stored in the recipient computer 128 would fail its next authentication. When authentication fails, a new version can be requested should the license 148 permit this.

In one embodiment, the signature tokens are used for expiring content objects. The license may state that access should expire after a certain time or the content licensor could otherwise determine access should no longer be allowed (e.g., where unauthorized use of the content is detected). By changing the authentication tokens and deleting or modifying the content license, any subsequent authentication check or DRM check would erase the content or otherwise prohibit use.

Figure 1B:
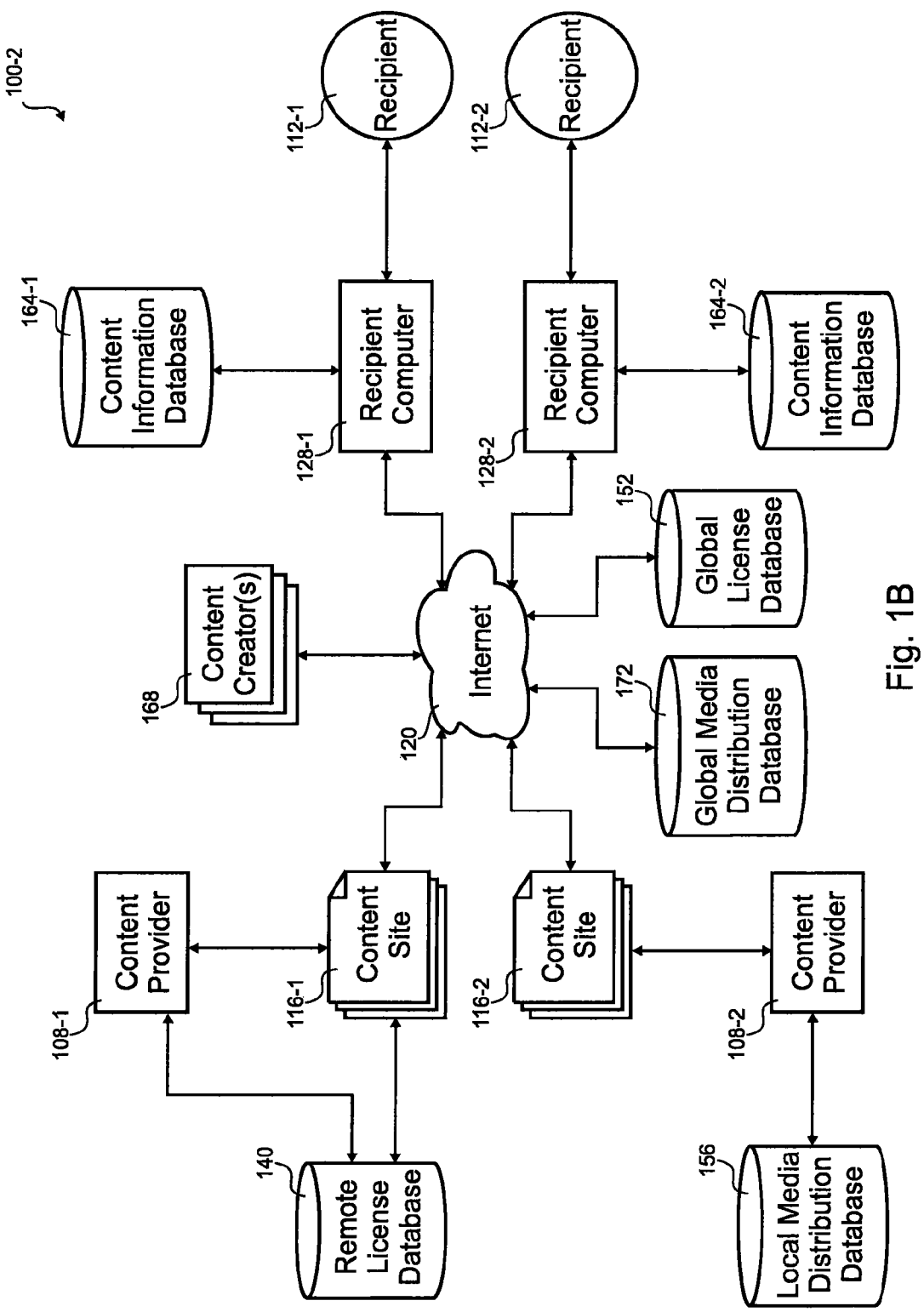

Referring next to FIG. 1B, a block diagram of an embodiment of a content download system 100-2 is shown. In this embodiment, the first content provider 108-1 uses a global media distribution database 172, but the second content provider 108-2 uses a local media distribution database 156. The global media distribution database 172 could be synchronized with any local media distribution databases 156 that are maintained throughout the system 100-2. The first content provider 108-1 has a remote license database 140, but the second content provider 108-2 uses a global license database 152.

A content information database 164 is used in this embodiment to store the content licenses 148 and authentication information 160. The content information database 164 could be part of the DRM for the recipient computer 128. As content is acquired, deleted or expired, the content information database 164 is updated. Additionally, the content information database 164 logs where on the recipient computer 128 the user saved the content object. If the license information stored local to the recipient computer 128 is lost for any reason, the recipient 112 could request that their content information database be repopulated in some embodiments.

Figure 2A:
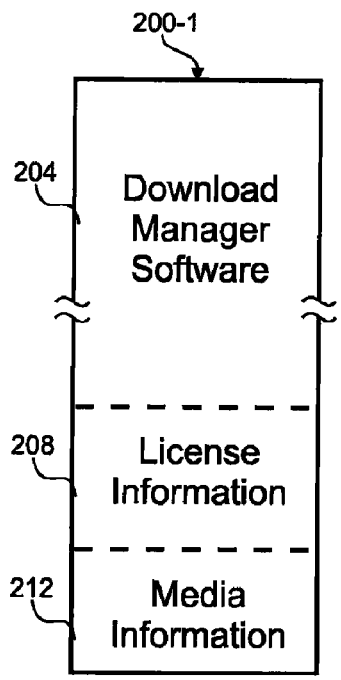
FIGS. 2A, 2B and 2C are data structures of embodiments of a download manager file.

With reference to FIG. 2A, a data structure of an embodiment of a download manager file 200-1 is shown. When one or more pieces of content are purchased, a download manager file 200 is formulated to facilitate the download process. The download manage file 200 includes download manager software 204, license information 208 and media information 212. In some embodiments, the license information 208 and the media information 212 could be in XML format and may or may not be encrypted.

The download manager software 204 is executed by activating the download manager file 200. The download manager software 204 takes the license information 208 and populates the local license database 136 with the licenses and terms purchased. Using the media information 212, the download manager software 204 can request the referenced pieces of content from the content provider 108. The media information 212 includes a location of the digital media file, any media identifier and could include a mechanism to identify the recipient 112. A content creator 168, the content provider 108, a content delivery network or any other origin server could be specified in the media information 212.

After each piece of content is downloaded, it is authenticated. Should the digital media file not authenticate, another copy is requested. Upon successfully receiving the file, the content provider is notified. The download manager software 204 also informs the content provider of the server, drive, path and filename that was for the digital media file.

The download manager file 200 can be executed anytime to initiate download and population of the license database 136. Execution of the file 200 at a second time may allow downloading the referenced pieces of content again. Some embodiments may limit the number of times that content pieces can be downloaded or may define a time period after which further downloads are no longer allowed.

When the download manager file 200 is executed after prior download, the download manager file 200 and referenced digital media files are authenticated again. Where a file is changed, deleted, infected with a virus or otherwise corrupted, the file can be replaced by the download manager software 204. A recipient can repopulate and check their library of content by executing all the download manager files 200 on his or her computer 128. In some embodiments another program manages this process of maintaining authentic content.

Figure 2B:
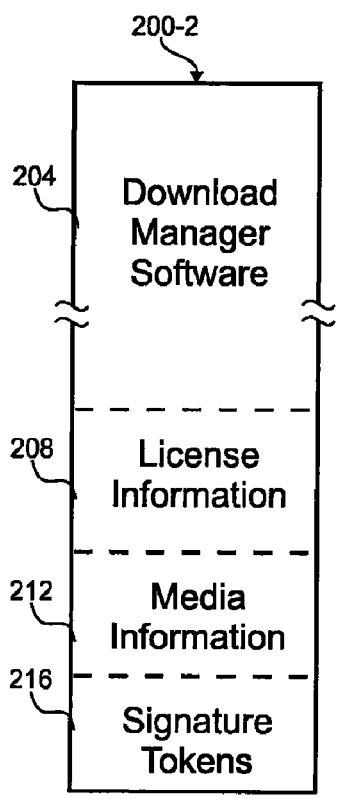

Referring next to FIG. 2B, a data structure of another embodiment of the download manager file 200-2 is shown. This embodiment includes signature tokens 216 in the download manager file 200-2. Each digital media file that is downloaded has a signature token 216 that can be used to authenticate the digital media file. The signature token 216 could be a hash, checksum, CRC, or some other code that is generated over the digital media file.

In one embodiment, encryption is used to authenticate the digital media file. A key is provided that can be used to decrypt the digital media file. If the digital media file has been modified, the decrypted file will be scrambled. Private or public keying could be used. Each digital media file and download manager file could be encrypted to provide a level of authentication. Encryption could be used in addition to the signature token in some embodiments.

Figure 2C:
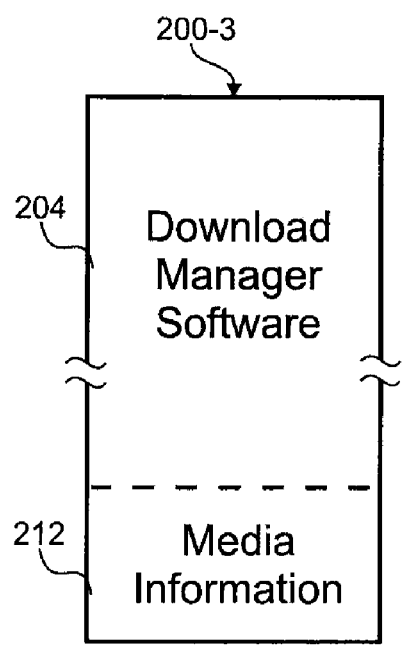

Referring next to FIG. 2C, a data structure of yet another embodiment of the download manager file 200-3 is shown. This embodiment only includes the download manager software 204 and media information 212. License information and signature tokens could be maintained by the content provider and/or in a global database accessible to the download manager software 204. Other embodiments could include the license information and signature tokens with the digital media file or download them separately.

Figure 3A:
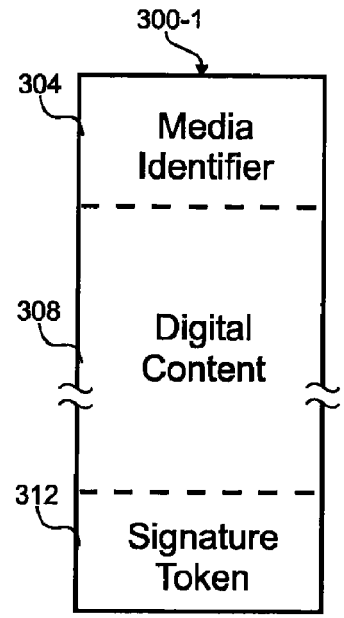
FIGS. 3A, 3B and 3C are data structures of embodiments of a digital media file.

With reference to FIG. 3A, a data structure of an embodiment of a digital media file 300-1 is shown. This embodiment of the digital media file 300-1 includes a media identifier 304, digital content 308 and a signature token 312. The media identifier 304 is a unique code that allows correlating the digital media file 300 to license information. Each recipient of a piece of content could have a unique code that is also stored in the media identifier 304 to allow correlation with a particular recipient 112. The digital content 308 is the payload that delivers the piece of content in whatever format it might take. The signature token 312 allows authenticating that the digital content 308 is unchanged.

After download and authentication, some embodiments separate the digital content 308 from some or all of the remaining portions of the digital media file 300. In some embodiments, portions of the removed portions are added into metadata supported by the digital content. For example, the media identifier 304 could be put in an ID3 tag of a MP3 file.

Figure 3B:
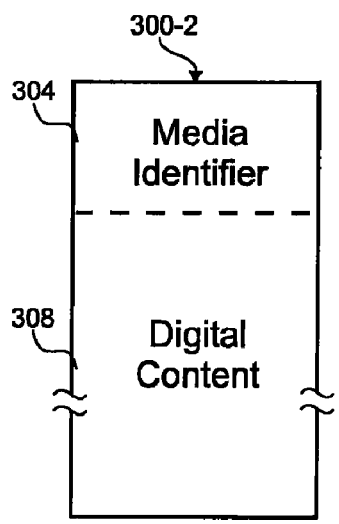

Referring next to FIG. 3B, a data structure of another embodiment of the digital media file 300-2 is shown. This embodiment does not include the signature token 312 with the digital media file 300. The token 312 could be included in the associated manager file 200, separately downloaded and/or available from a remote database. A database local to the recipient computer 128 could store the tokens 312 for later authentications.

Figure 3C:
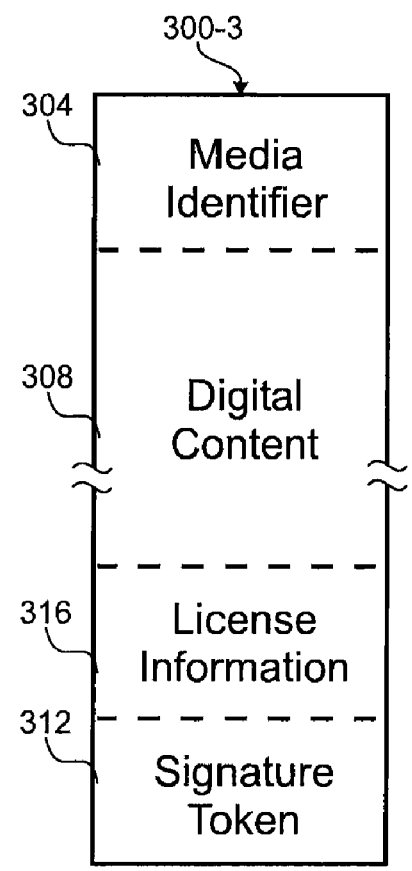

With reference to FIG. 3C, a data structure of yet another embodiment of a digital media file 300-3 is shown. This embodiment includes the media identifier 304, the digital content 308, license information 316, and the signature token 312. The license information 316 indicates the copyright license and terms available for the digital content 308. After download, the license information could be loaded into a database local to the recipient computer 128 or otherwise store them.

Figure 4:
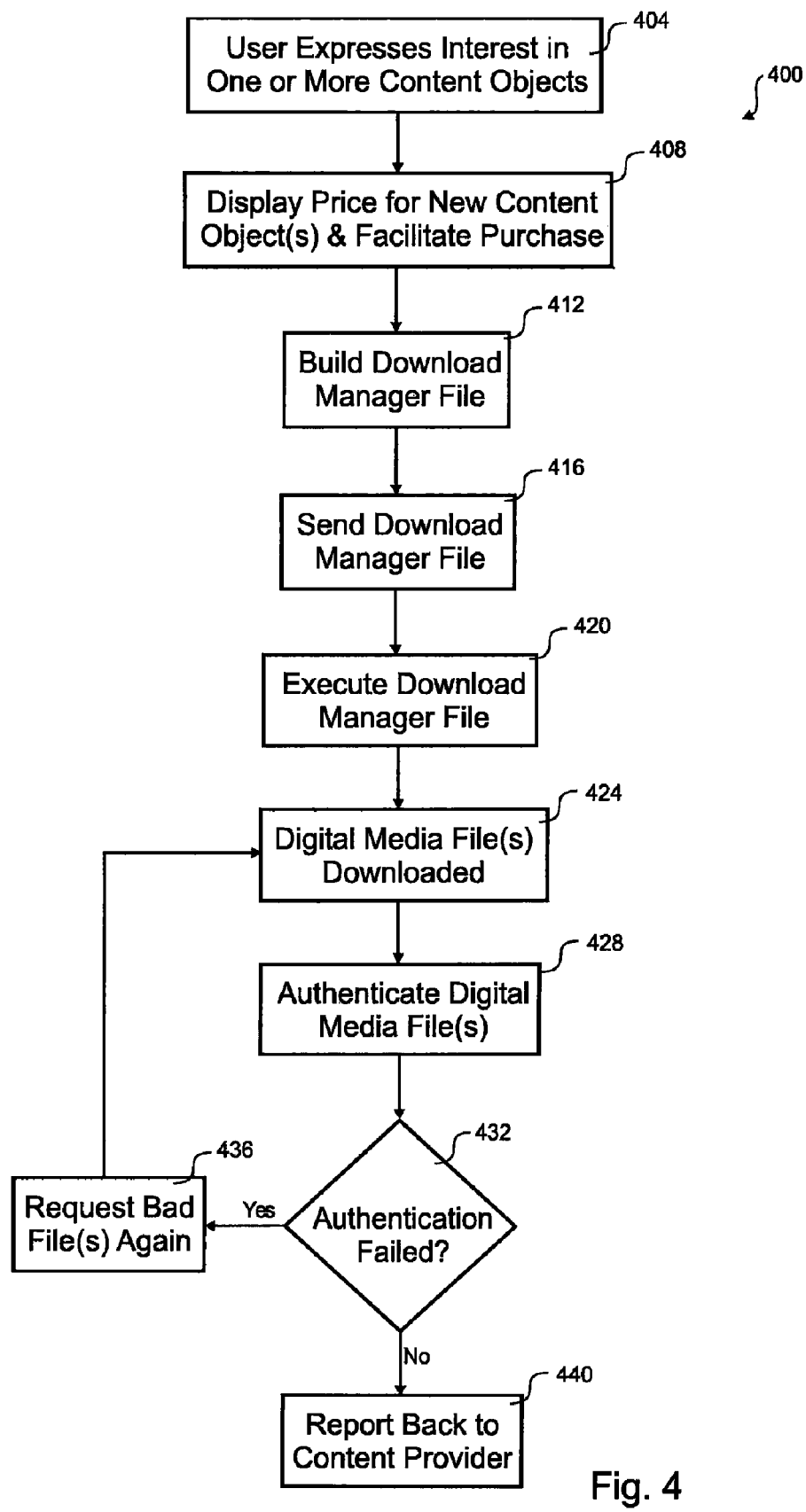
FIG. 4 is a flow diagram of an embodiment of a process for downloading and authenticating digital content.

Referring next to FIG. 4, a flow diagram of an embodiment of a process 400 for downloading and authenticating digital content is shown. The depicted portion of the process 400 begins in step 404 where the user expresses interest in one or more content objects to download as part of the same transaction. In step 408, cost and any payment is gathered such that a contract to buy the content objects is entered. The content provider 108 formulates the download manager file 200 in step 412. The download manager software 204 is already complied in this embodiment, such that after the media information 212 and any other additional information is added the download manager file 200 can be quickly formulated.

In step 416, the download manager file is sent to the recipient computer 128. This embodiment makes available a signature of the download manager file 200 to allow authentication of the file 200 after download. Completion of the download can trigger executing the download manger file 200 or the user can choose to manually execute the file 200 at a later time. Some embodiments limit the amount of time (e.g., 1 hour, 1 day, 2 days, 1 week, 1 month, 3 months, 1 year, etc.) that the user can wait before initiating the download. Execution of the download manager file 200 takes place in step 420.

In step 424, the digital media files 300 are downloaded 424 in a parallel fashion. In this embodiment, a HTTP download using TCP is used to download the digital media files 300, but other types of downloads and protocols could be used in other embodiments. According to the media information 212, the digital media files 300 could be located in various places across the Internet 120. Authentication of the digital media file 300 in step 428 is performed after download. Some embodiments authenticate before storage of the digital media files 300, but other embodiments authenticate after storage. Where authentication fails in step 432, the bad file(s) are requested again in step 436. Some embodiments may ask the user if they want to request the files again or at some later time. Although this embodiment authenticates the whole media file 300, other embodiments could authenticate portions and request replacement of only the corrupt portions.

This embodiment shows the digital media files 300 being downloaded in parallel, but other embodiments could do this is parallel and/or serial fashion. Some embodiments could manually select how this is done and could specify the bandwidth to use for the download as a percentage of the forward bandwidth or as a ceiling bitrate.

Where the content files 300 specified in the download manager file 200 are successfully authenticated in step 432, processing continues to step 440. Authentication of content files 300 is reported back to the content provider 108. In this way, the content provider 108 can confirm delivery rather than just assuming that it has occurred. Additionally, a message could be presented to the user in some embodiments that indicates that the download was successful and could give statistics related to the download. The download manager software 204 can also report to the content provider 108 where each content file 300 was stored. This information is stored in a local or global media distribution database 156, 172. The download manager file 200 also interacts with the DRM, stores the content licenses 148 and authentication information 160. Some of this interaction may be with a content information database 164 for storage of the information.

Figure 5:
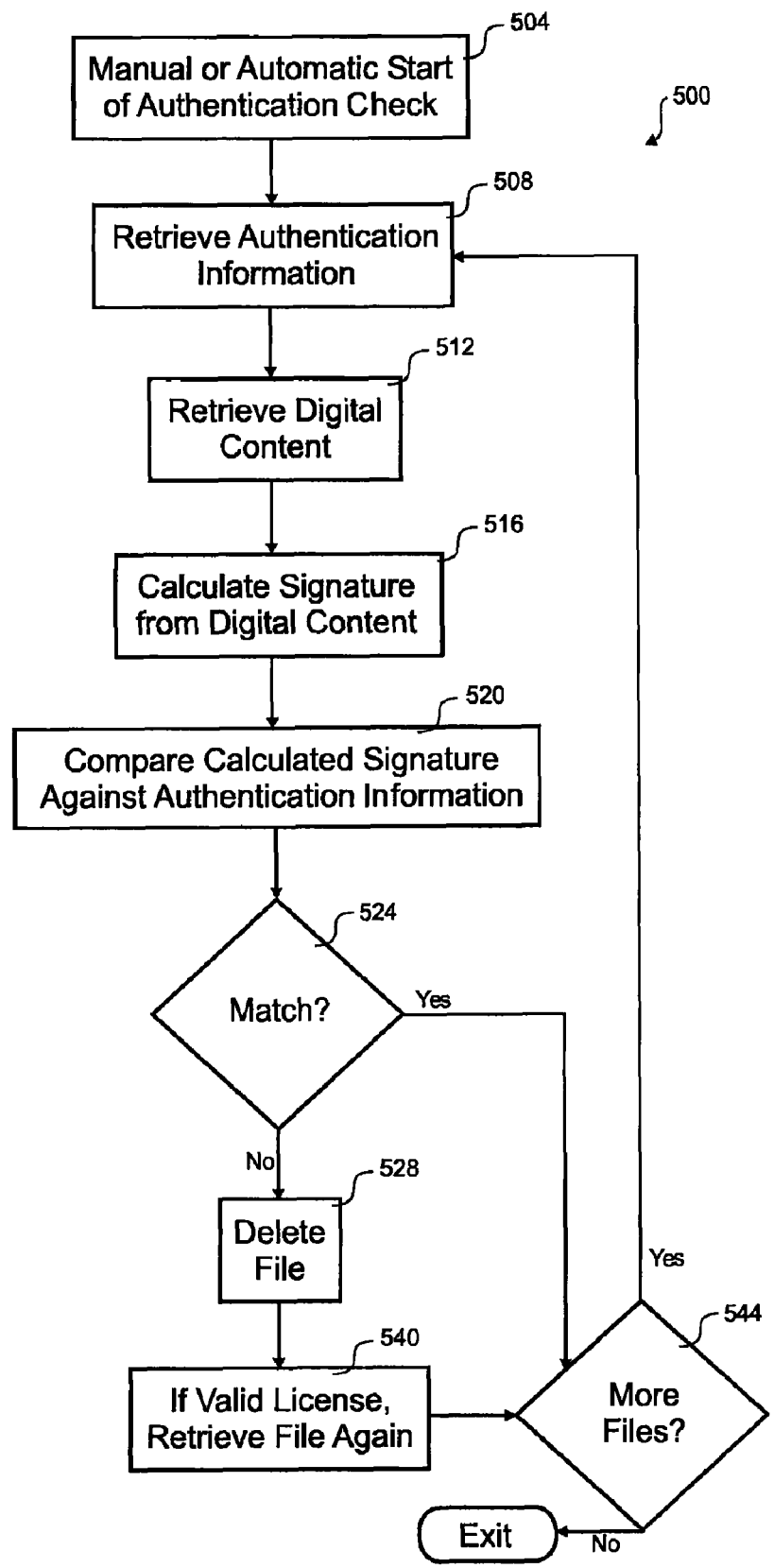
FIG. 5 is a flow diagram of an embodiment of a process 500 for authenticating a content library.

With reference to FIG. 5, a flow diagram of an embodiment of a process 500 for authenticating a content library is shown. An authentication program, applet or process run on the recipient computer 128 can authenticate one or more pieces of content periodically. The authentication program could be application software, part of the DRM or part of the operating system. In step 504, the authentication program can be automatically or manually started. Automatic activation could be configured by the content provider 108 or recipient 112. Various options could be available, such as, daily, weekly or monthly. In some embodiments, the content provider 108 or some other entity can trigger the authentication process to begin.

In step 508, authentication information 160 is retrieved locally or remote to the recipient computer. For example, the recipient computer could request authentication information from a content information database 164, a remote media distribution database 156, and/or a global media distribution database 172. All or part of the content library could be checked in this process. This embodiment only checks authentication, but other embodiments could check authorization in a similar manner by checking licenses and terms.

The digital content 308 is retrieved in step 512. A signature is calculated in step 516. The calculated signature is checked against the signature stored in the authentication information 160 in step 520. Where the digital content 308 is unchanged and authentic as determined in step 524, processing continues to step 544 to determine if more content requires checking. Where there are more files, processing loops back to step 508 to process the next piece of content.

If the digital content 308 has changed, the signatures will most likely not match in step 524. Processing would then proceed to step 528 where the file is deleted or destroyed. In some embodiments, the user may be given the option to keep the digital content 308. Before downloading a replacement a check of the content license 148 is performed to see if a replacement is allowed before retrieval of a replacement in step 540. For example, the DRM function could be queried to see if the corrupt file should be accessible. In this way, it can be confirmed that the digital content is licensed, but corrupt.

The above embodiments determine a signature with the recipient computer 128 and then determine if it matches the signature received from the content provider 108. Other embodiments could report the determined signature back to the content provider 108 who would check for a match. In this way, the recipient computer would not be delivered any signature, but could be sent the content file where it could not be authenticated by the content provider 108.

If there are more digital content 308 to check as determined in step 544, processing loops back to step 508 to check the next piece of content. This process continues until all the authentication enabled content objects are checked.

While the principles of the invention have been described above in connection with specific apparatuses and methods, it is to be clearly understood that this description is made only by way of example and not as limitation on the scope of the invention.

What is claimed is:

1. A computing device for downloading and managing a digital media content file received via a network, the computing device comprising:
a network interface; and
one or more hardware processors coupled with the network interface and configured to:
send, using the network interface, an indication of selection of the digital media content file;
receive the digital media content file with corresponding metadata via the network;
store the digital media content file and metadata in a memory;
determine a decryption key, wherein the decryption key is unique to a user of the computing device;
decrypt the digital media content file using the decryption key;
monitor the digital media content file to detect a change to the digital media content file by comparing a calculated value with the store metadata; and
automatically taking an action if the change is detected, wherein the action comprises deleting the digital media content file if the one or more hardware processors detect the digital media content file has changed and receiving and decrypting the digital media content file again.

2. The computing device for downloading and managing the digital media content file received via the network recited in claim 1, wherein the one or more hardware processors are further configured to receive, using the network interface, information indicative of the decryption key.

3. The computing device for downloading and managing the digital media content file received via the network recited in claim 1, wherein the one or more hardware processors are further configured to receive a media identifier comprising a unique code, wherein the unique code correlates the digital media content file to license information.

4. The computing device for downloading and managing the digital media content file received via the network recited in claim 3, wherein the one or more hardware processors are further configured to prohibit use of the digital media content file when the license information indicates a license for the digital media content file has expired.

5. The computing device for downloading and managing the digital media content file received via the network recited in claim 1, wherein the calculated value comprises a hash value.

6. A computer-implementable method for downloading and managing a digital media content file on a computing device communicatively coupled with a network, the method comprising:
sending, with the computing device, an indication of selection of the digital media content file via the network;
receiving the digital media content file with corresponding metadata via the network;
storing the digital media content file and metadata in memory;
determining a decryption key, wherein the decryption key is unique to a user of the computing device;
decrypting the digital media content file using the decryption key;

monitoring, via the computing device, the digital media content file to detect a change to the digital media content file by comparing a calculated value with the store metadata; and
automatically taking an action if the change is detected, wherein the action comprises deleting the digital media content file if the one or more hardware processors detect the digital media content file has changed and receiving and decrypting the digital media content file again.

7. The computer-implementable method for downloading and managing the digital media content file on the computing device communicatively coupled with the network recited in claim 6, further comprising receiving information indicative of the decryption key over the network.

8. The computer-implementable method for downloading and managing the digital media content file on the computing device communicatively coupled with the network recited in claim 6, further comprising receiving a media identifier comprising a unique code, wherein the unique code correlates the digital media content file to license information.

9. The computer-implementable method for downloading and managing the digital media content file on the computing device communicatively coupled with the network recited in claim 8, further comprising prohibiting use of the digital media content file when the license information indicates a license for the digital media content file has expired.

10. The computer-implementable method for downloading and managing the digital media content file on the computing device communicatively coupled with the network recited in claim 6, wherein the storing the digital media content file in memory occurs before the decrypting the digital media content file using the decryption key.

11. The computer-implementable method for downloading and managing the digital media content file on the computing device communicatively coupled with the network recited in claim 6, further comprising reporting, to a location away from the computing device, where the digital media content file was stored.

12. The computer-implementable method for downloading and managing the digital media content file on the computing device communicatively coupled with the network recited in claim 6, wherein the calculated value comprises a hash value.

13. A non-transitory computer-readable storage medium having computer-executable instructions for downloading and managing a digital media content file on a computing device communicatively coupled with a network, the instructions, when executed by a computer, cause the computer to:
send an indication of selection of the digital media content file via the network;
receive the digital media content file with corresponding metadata via the network;
store the digital media content file and metadata in memory;
determine a decryption key, wherein the decryption key is unique to a user of the computing device;
decrypt the digital media content file using the decryption key;
monitor, via the computing device, the digital media content file to detect a change to the digital media content file by comparing a calculated value with the store metadata; and
automatically taking an action if the change is detected, wherein the action comprises deleting the digital media content file if the one or more hardware processors detect the digital media content file has changed and receiving and decrypting the digital media content file again.

14. The non-transitory computer-readable storage medium having computer-executable instructions for downloading and managing a digital media content file on a computing device communicatively coupled with the network recited in claim 13, wherein the instructions, when executed by the computer, further cause the computer to receive a media identifier comprising a unique code, wherein the unique code correlates the digital media content file to license information.

15. The non-transitory computer-readable storage medium having computer-executable instructions for downloading and managing a digital media content file on a computing device communicatively coupled with the network recited in claim 14, wherein the instructions, when executed by the computer, further cause the computer to prohibit use of the digital media content file when the license information indicates a license for the digital media content file has expired.

16. The non-transitory computer-readable storage medium having computer-executable instructions for downloading and managing a digital media content file on a computing device communicatively coupled with the network recited in claim 13, wherein the instructions, when executed by the computer, cause the computer to store the digital media content file in memory before the decrypting the digital media content file using the decryption key.

17. The non-transitory computer-readable storage medium having computer-executable instructions for downloading and managing a digital media content file on a computing device communicatively coupled with the network recited in claim 13, wherein the calculated value comprises a hash value.

* * * * *